(12) United States Patent
Allen

(10) Patent No.: US 7,274,699 B2
(45) Date of Patent: Sep. 25, 2007

(54) METHOD FOR SETTING MASKS FOR MESSAGE FILTERING

(75) Inventor: William E. Allen, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 1106 days.

(21) Appl. No.: 10/247,638

(22) Filed: Sep. 20, 2002

(65) Prior Publication Data
US 2004/0057432 A1   Mar. 25, 2004

(51) Int. Cl.
*H04L 12/56* (2006.01)
(52) U.S. Cl. ...................................... 370/392
(58) Field of Classification Search ................ 726/13; 370/389, 392; 711/216–217, 220
See application file for complete search history.

(56) References Cited

U.S. PATENT DOCUMENTS

| | | |
|---|---|---|
| 5,418,526 A | 5/1995 | Crawford |
| 5,430,715 A | 7/1995 | Corbalis et al. |
| 5,640,393 A | 6/1997 | Lo et al. |
| 5,958,029 A | 9/1999 | McKinnon |
| 6,041,053 A * | 3/2000 | Douceur et al. ............ 370/389 |
| 6,104,728 A * | 8/2000 | Heinrich ..................... 370/475 |
| 2003/0123456 A1* | 7/2003 | Denz et al. ................. 370/400 |
| 2003/0123459 A1* | 7/2003 | Liao ........................... 370/401 |
| 2004/0153583 A1* | 8/2004 | Bartling ...................... 710/29 |

\* cited by examiner

*Primary Examiner*—Kwang Bin Yao
*Assistant Examiner*—Tung Tran
(74) *Attorney, Agent, or Firm*—Finnegan, Henderson, Farabow, Garrett & Dunner

(57) ABSTRACT

A method is provided for determining a global mask value for filtering incoming messages in a CAN environment having a predetermined number of match registers, where the global mask value has one or more bits. A set of incoming messages to be identified is established. Each of the one or more bits in the global mask value is set to a first digital value. The following steps are repeated until the set of incoming messages to be identified fits within a predetermined number of match registers: adding a don't_care bit to the global mask value and determining a best position for the added don't_care bit. The don't_care bit is represented by a second digital value in the best position.

5 Claims, 3 Drawing Sheets

| | | | |
|---|---|---|---|
| 100 ~ | 100 | 1100 | 0001 |

| 110 ~ | 011 | 1111 | 1100 |
|---|---|---|---|

| | | | |
|---|---|---|---|
| 120 ~ | 000 | 1100 | 0000 |

| | | | | |
|---|---|---|---|---|
| 132 ~ | 010 | 1100 | 0000 | |
| 134 ~ | 000 | 1100 | 0100 | |
| 136 ~ | 000 | 1100 | 0000 | ~130 |
| 138 ~ | 011 | 1000 | 0000 | |

METHOD FOR SETTING MASKS FOR MESSAGE FILTERING

TECHNICAL FIELD

The present invention relates generally to controller area network data links and, more particularly, to a method for determining effective mask values for filtering CAN messages.

BACKGROUND

Controller area network (CAN) data links are used in a number of industries, such as the automotive industries, for providing bus connections between simple industrial devices, such as sensors or actuators, and higher-level devices, such as an electronic control module (ECM). Each message on the data link has an associated identifier. The identifier may specify one or more particular nodes to which the message is directed; alternatively, the identifier may identify the message as a broadcast message for all nodes. Each node needs to determine if it is interested in each incoming message, based at least in part on the identifier. For example, in the SAE J1939 CAN standard, an identifier may include a message priority field, a source ID, a destination ID, and a parameter group number (PGN). The source and destination IDs are correspond to the nodes sending the message and the nodes to which the message is directed; the PGN is related to the information content.

Typically, the determination by the node of whether that node is interested in a particular incoming message involves comparing an incoming message identifier with each of the defined identifiers associated with the node. These defined identifiers may be stored as match registers or receive registers. The comparison operation may require significant processing overhead. One disadvantage of this operation is that the significant processing overhead may limit the throughput associated with the data link Further, the processor may not have time to perform any other computations required.

One method to overcome this disadvantage is to provide filtering via one or more mask registers. Rather than comparing each incoming message with each of the match registers, the message is first compared to a mask register to determine if the message can be ignored, thus saving the processing time associated with comparing the message to each match register. Mask registers are typically included in CAN interface hardware. Mask registers are set up to indicate which bits of an incoming identifier must be matched to at least one of the defined identifiers in order for a message to be received, and thereby generate an interrupt. Using mask registers thus saves processing time and overhead by reducing the number of messages that need to be compared.

One known method for using mask registers for processing received messages is described in U.S. Pat. No. 5,958, 029. This system uses a single comparator circuit and a direct memory access (DMA) controller for comparing an identifier associated with the incoming message against a set of match registers (or defined identifiers for the nodes) based on a plurality of mask registers.

Regardless of the method used for comparing the identifier associated with the incoming message and the match registers, it is important that the mask register be set up accurately to avoid unnecessary processor overhead. In particular, ineffective mask registers may allow the inclusion of too many messages, including messages not directed at a particular node, causing wasted processor time and excessive interrupts. On the other hand, a mask register that excludes a message directed to a particular node, or excludes a broadcast message, may result in improper operation of the system.

One challenge in setting up mask registers results from the arbitrary method in which identifiers may be set. For example, the SAE J1939 CAN protocol identifiers may include a message priority field, a source ID, a destination ID, and a PGN, as described above. The identifiers are then assigned in numerical order. This assignment method, therefore, is not intended to optimize any sort of masking.

The present invention is directed to overcoming one or more of the problems or disadvantages associated with the prior art.

SUMMARY OF THE INVENTION

A method is provided for determining a global mask value for filtering incoming messages in a CAN environment having a predetermined number of match registers, where the global mask value has one or more bits. A set of incoming messages to be identified is established. Further, a set of incoming messages to be ignored is also identified. Each of the one or more bits in the global mask value is set to a first digital value. The following steps are repeated until the set of incoming messages to be identified fits within the predetermined number of match registers: adding a don't_care bit to the global mask value and determining a best position for the added don't_care bit. The don't_care bit is represented by a second digital value in the best position.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings:

FIG. 1 is an illustration of the general operation of mask and match registers, consistent with one exemplary embodiment of the present invention;

DETAILED DESCRIPTION

Figure 2:
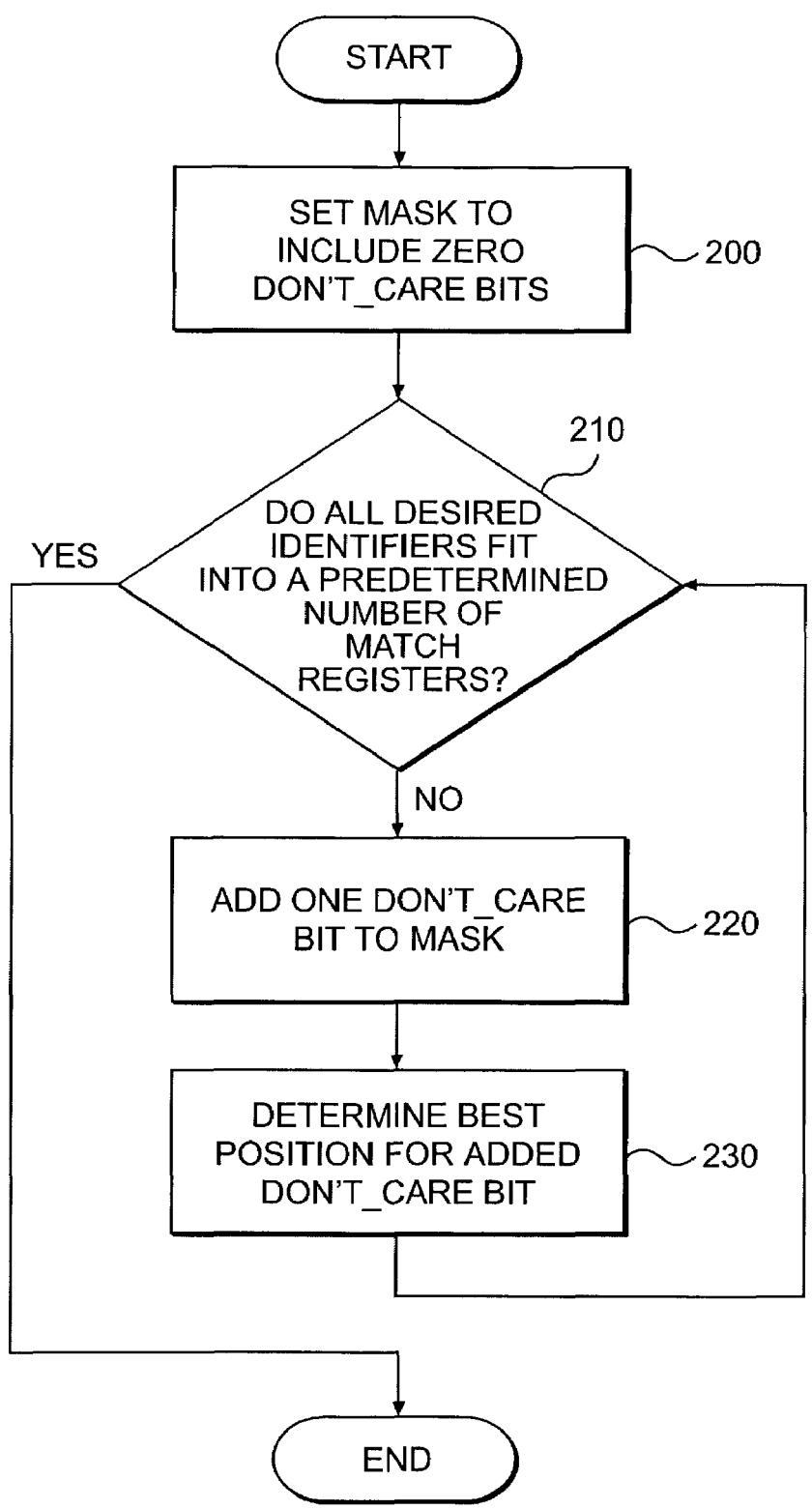
FIG. 2 is a flow chart of steps for determining an effective global mask register, consistent with one exemplary embodiment of the present invention.

Reference will now be made in detail to embodiments of the invention, examples of which are illustrated in the accompanying drawings. Wherever possible, the same reference numbers will be used throughout the drawings to refer to the same or like parts.

FIG. 1 illustrates the general operation of mask and match registers, consistent with an exemplary embodiment of the present invention. Incoming message identifier 100 may include a string of bits. As described above, these bit positions and values may be identified by the CAN protocol being used. Global mask register 110 indicates the bits that need to be matched in order for the message to not be ignored by the CAN processor. For example, a "1" may indicate a bit that needs to be matched, whereas a "0" may indicate a don't_care bit. The bit positions where the mask register is "1" need to result in a match between the incoming identifier and one of the identifiers defined for the node. Don't_care bits do not need to match and can be ignored. An incoming message identifier 100 may be masked by mask 110 to result in a masked incoming identifier 120. The masked incoming identifier may include the same bit values in the bit positions where the mask is "1" and may change the bit value to "0" in the don't_care bit positions. For example, the first bit of incoming message identifier 100 is "1." The mask register 110 indicates that the first bit is a don't_care bit, therefore, the masked incoming identifier 120 is changed to "0", because the true value does not matter (i.e., it is a don't_care bit). Mask register 110 indicates that the second bit is not a don't_care bit, thus, masked incoming identifier 120 keeps the same value for the second bit ("0") as the incoming message identifier 100. Finally, match registers 130 include the message identifiers defined for the node; when a masked incoming identifier 120 matches one of these match registers, the system generates an interrupt and the message is processed. Using mask register 110, each of the match registers 132-138 are compared to masked incoming identifier 120. In the illustrated example, masked incoming identifier 120 matches match register 136. Although four match registers are illustrated in FIG. 1, it should be understood that any number of match registers may be used.

Although it would result in excessive processing, ideal operation of the system would occur if a match register 130 existed for each message the node desired to receive and the mask register 110 consisted of all "1s". In this exemplary situation, each incoming message identifier would be compared, in total, to the set of desired message identifiers. All messages would be properly identified as either desired or to be ignored. This situation is not possible or desirable. The number of match registers 130 are limited by the manufacturer. Additionally, the overhead required for comparing each bit of an incoming message with a large number of match registers may severely limit the operation of the system. It is desirable, therefore, to use a fewer number of match registers in order to reduce the amount of processing required, and in any case, the number of match registers must be equal or less than those allowed by the manufacturer.

The number of match registers 130 can be reduced, therefore, by appropriately setting the mask register, both to accurately identify messages that should generate an interrupt and to reduce the number of messages that should be ignored but are processed by the system. Methods consistent with the present invention are directed towards determining an effective value for mask register 110.

FIG. 2 is a flow chart illustrating an exemplary method for determining an effective global mask register. In order to determine an effective mask register, a number of variables must be known including, for example: the number of bits in the incoming identifier 100, the number of match, or receive, registers 130 provided by the manufacturer, a set of message identifiers that a particular node desires to receive, a set of message identifiers for the node that should be ignored or excluded, and the frequency of messages to be excluded. With this information, a global mask register 110 may be created. The global mask register has the same number of bits as the message identifiers. For example, in J1939 systems, the mask value will have either 11 bits, for a standard format identifier, or 29 bits, for the extended format identifier. Global mask register 110 is first programmed to include no don't_care bits (step 200). Typically, a bit that is not a don't care bit is represented by a "1." Each bit that is represented by a "1" in the mask register 110 then must result in a match between the bit of the incoming message identifier 100 and the corresponding bit of a particular match register 130 to cause the message to not be ignored. Conversely, a don't_care bit indicates a bit of the register that does not affect an included message from being identified, and may be signified by a "0" in the bit position. Thus, global mask register 110 is initially set to all "1s."

Next, a loop is begun to add don't_care bits (or "0s") to the global mask register 110 until all desired identifiers can be matched using the number of match registers 132-138 provided (step 210). There may be more identifiers defined than match registers available. However, using global mask register 110 permits the number of identifiers to be reduced. Once all of the included identifiers fit into the number of match registers, the global mask register 110 is set and the resulting global mask register may be provided to an operator.

The loop of step 210 includes the following steps: If the included identifiers do not fit into the number of match registers 132-138, one don't_care bit is added to the global mask register 110 (step 220). A best position for the newly added don't_care bit is then identified (step 230) using a method described in more detail with respect to FIG. 3. The global mask register 110 including the newly added don't_care bit in the best position is kept, and the method returns to step 210.

Figure 3:
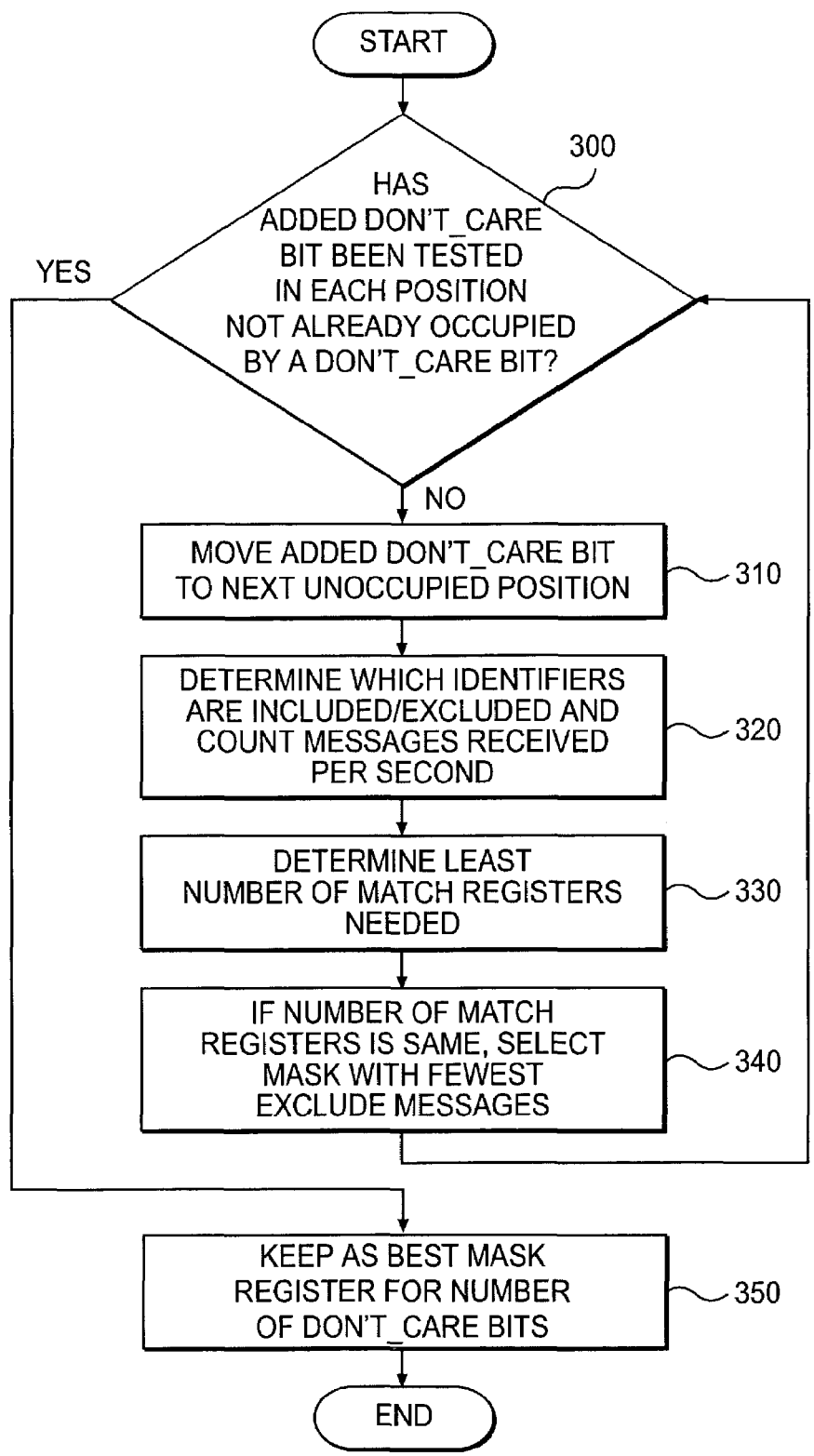
FIG. 3 is a flow chart illustrating one of the steps of FIG. 2 in further detail, consistent with one exemplary embodiment of the present invention.

FIG. 3 illustrates an exemplary method for determining the best position for the newly added don't_care bit, corresponding to step 230 of FIG. 2. A loop is begun to test the newly added don't_care bit in each position of the global mask register 120 not occupied by a don't_care bit (step 300). Within this loop, the don't_care bit is moved to the next position unoccupied by a don't_care bit (step 310). During the first iteration of the loop, the added don't_care bit may be positioned in the first position. Next, identifiers which would be included or excluded are determined based on the remaining bits that are not don't_care bits (step 320). Also, the messages received per second are counted. The number of match registers is determined, and the position of the newly added don't_care bit is considered among the best positions if the number of match registers 132-138 is the fewest required (step 330). If there is more than one position that requires the same number of match registers 132-138, the global mask register 110 resulting in the least frequency of excluded messages is chosen as the best (step 340). After each possible position is tested for the newly added don't_care bit, the best global mask register 110 is kept (step 350).

INDUSTRIAL APPLICABILITY

By using methods consistent with the present invention, a global mask register can be determined that results in lower processing time and overhead, while still providing effective message filtering. Embodiments of the present invention have potential application in a variety of CAN data links utilizing different identification standards.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method for determining a global mask value for filtering incoming messages in a controller area network environment having a predetermined number of match registers and the global mask value having one or more bits, the method comprising:

establishing a set of incoming messages to be identified;
establishing a set of incoming messages to be ignored;
setting each of the one or more bits in the global mask value to a first digital value; and
repeating, until the set of incoming messages to be identified fits within the predetermined number of match registers, the following steps:
adding a don't_care bit to the global mask value; and
determining a best position for the added don't_care bit,
wherein the don't_care bit is represented by a second digital value in the best position,
providing a final global mask value when the repeated steps are completed: and
filtering the incoming messages in accordance with the final global mask value.

2. The method of claim 1, wherein the step of determining a best position includes:

repeating, for each bit position of the global mask value, the following steps:
determining if the bit position is a don't_care bit;
if not, setting the bit position in a test mask value to a don't_care bit; and
determining if the test mask value provides a predetermined degree of filtering.

3. The method of claim 2, wherein the step of determining if the test mask value provides a predetermined degree of filtering includes:

determining which incoming messages from the set of incoming messages is included by comparison to the test mask value;
determining which incoming messages from the set of incoming messages is excluded by comparison to the test mask value;
determining a frequency of incoming messages received; and
determining a least number of match registers needed to include all of the set of incoming messages.

4. The method of claim 1, wherein the first digital value is "1" and the second digital value is "0".

5. A method for determining a global mask value for filtering incoming messages in a controller area network environment, the global mask value having one or more bits, the method comprising:

establishing a set of incoming messages to be identified;
setting each of the one or more bits in the global mask value to "1";and
repeating, until the set of incoming messages to be identified fits within a predetermined number of match registers, the following steps;
adding a don't_care bit to the global mask value;
determining a best position for the added don't care bit by repeating, for each bit position of the global mask value, the following steps:
determining if the bit position is a don't_care bit;
if not, setting the bit position in a test mask value to a don't_care bit;
determining which incoming messages from the set of incoming messages is included by comparison to the test mask value;
determining which incoming messages from the set of incoming messages is excluded by comparison to the test mask value;
determining a frequency of incoming messages received; and
determining a least number of match registers needed to include all of the set of incoming messages,
wherein the don't_care bit is represented by a "0" in the best position;
providing a final global mask value when the repeated steps are completed: and
filtering the incoming messages in accordance with the final global mask value.

* * * * *